(12) United States Patent
Locker et al.

(10) Patent No.: US 9,021,121 B2
(45) Date of Patent: Apr. 28, 2015

(54) SETTING A RATE OF DATA TRANSMISSION IN A PEER-TO-PEER MODE

(75) Inventors: Howard Locker, Cary, NC (US); Daryl Cromer, Cary, NC (US); Philip John Jakes, Durham, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 390 days.

(21) Appl. No.: 13/163,372

(22) Filed: Jun. 17, 2011

(65) Prior Publication Data

US 2012/0324124 A1 Dec. 20, 2012

(51) Int. Cl.
G06F 15/16 (2006.01)
H04W 72/04 (2009.01)
H04W 28/22 (2009.01)
H04W 76/02 (2009.01)

(52) U.S. Cl.
CPC .......... *H04W 72/0486* (2013.01); *H04W 28/22* (2013.01); *H04W 76/023* (2013.01)

(58) Field of Classification Search
CPC .............. H04L 63/0428; H04L 12/189; H04L 12/2832
USPC ........................................................ 709/233
See application file for complete search history.

(56) References Cited

U.S. PATENT DOCUMENTS

| | | | | |
|---|---|---|---|---|
| 5,968,132 | A * | 10/1999 | Tokunaga et al. | 709/247 |
| 2002/0194361 | A1* | 12/2002 | Itoh et al. | 709/233 |
| 2003/0074668 | A1* | 4/2003 | Carlin et al. | 725/95 |
| 2003/0220108 | A1* | 11/2003 | Kojima et al. | 455/435.3 |
| 2003/0224812 | A1* | 12/2003 | Gassho et al. | 455/509 |
| 2005/0239451 | A1 | 10/2005 | Periyalwar et al. | |
| 2005/0243781 | A1* | 11/2005 | Vesuna et al. | 370/338 |
| 2006/0013235 | A1* | 1/2006 | Farnham | 370/401 |
| 2006/0114836 | A1 | 6/2006 | Pollin et al. | |
| 2007/0133712 | A1* | 6/2007 | Benjebbour et al. | 375/295 |
| 2011/0122780 | A1 | 5/2011 | Nieminen et al. | |
| 2012/0134344 | A1* | 5/2012 | Yu et al. | 370/336 |

FOREIGN PATENT DOCUMENTS

WO 2011/015250 A1 2/2011

OTHER PUBLICATIONS

Chaparro, PA et al., "Supporting Scalable Video Transmission in MANETs Through Distributed Admission Control Mechanisms" 18th Euromicro Conference on Parallel, Distributed and Network-based Processing. Feb. 2010, pp. 238-245.
Hui Ma et al., "Optimizing 802.11 Wireless Mesh Networks Based on Physical Carrier Sensing", IEEE/AMC Transactions on Network, vol. 17, Issue 5, Oct. 2009, pp. 1550-1563.
Benslimane, A. et al., "Relative Fairness and Optimized Throughput for Mobile Ad hoc Networks*", IEEE ICC, May 2008, pp. 2233-2237.
Fallah, YP et al., "An Optimized Link Adaptation Scheme for Efficient Delivery of Scalable H.264 Video over IEEE 802.11n", IEEE ISCAS May 2008, pp. 2058-2061.

\* cited by examiner

*Primary Examiner* — Hua Fan
(74) *Attorney, Agent, or Firm* — Kunzler Law Group

(57) ABSTRACT

An apparatus and method are presented for a maximum speed criterion for a velocity gesture. The apparatus includes a processor, a memory, a determination module and a transmission module. The determination module determines, through a wireless communication infrastructure mode, an amount of wireless network activity. The transmission module sets a rate of data transmission in a peer to peer mode based on the amount of wireless network activity.

19 Claims, 4 Drawing Sheets

SETTING A RATE OF DATA TRANSMISSION IN A PEER-TO-PEER MODE

BACKGROUND

1. Field

The subject matter disclosed herein relates to data transmission in a peer-to-peer mode and more particularly relates to setting a rate of data transmission in a peer-to-peer mode.

2. Description of the Related Art

Certain software protocols, such as WiFi Direct, allow certain wireless local area network ("WLAN") devices to communicate directly with other WLAN devices in peer-to-peer mode without an external wireless access point. Devices capable of communicating with these software protocols may include personal computers, pads, notebooks, phones, displays, media players, printers, handheld computing devices, and the like.

One such use for these software protocols may include transmitting video from a device to a display. However, transmitting large amounts of data, such as video, in peer-to-peer mode may impact network performance of other nearby WLAN devices.

BRIEF SUMMARY

Based on the foregoing discussion, the inventors have recognized a need for an apparatus and method for setting a rate of data transmission in a peer-to-peer mode. Beneficially, such an apparatus and method set the rate of data transmission according to an amount of wireless network activity.

The embodiments of the present disclosure have been developed in response to the present state of the art, and in particular, in response to the problems and needs in the art that have not yet been fully solved by currently available data transmission devices. Accordingly, the embodiments have been developed to provide a method and system for setting a rate of data transmission in a peer-to-peer mode that overcome many or all of the above-discussed shortcomings in the art.

An apparatus is provided with a processor, a memory, and a plurality of modules configured to functionally execute the steps of determining amount of wireless network activity and setting a rate of data transmission. These modules in the described embodiments include a determination module and a transmission module.

In one embodiment, the determination module determines, through a wireless communication infrastructure mode, an amount of wireless network activity. In one embodiment, the transmission module sets a rate of data transmission in a peer to peer mode based on the amount of wireless network activity.

A method is also presented. The method in the disclosed embodiments substantially includes the steps to carry out the functions presented above with respect to the operation of the described apparatus.

The method includes, in one embodiment, determining, through a wireless communication infrastructure mode, an amount of wireless network activity. In one embodiment, the method includes setting a rate of data transmission in a peer to peer mode based on the amount of wireless network activity.

A computer program product is also presented. In one embodiment, the computer program product includes determining, through a wireless communication infrastructure mode, an amount of wireless network activity. In one embodiment, the computer program product includes setting a rate of data transmission in a peer to peer mode based on the amount of wireless network activity.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
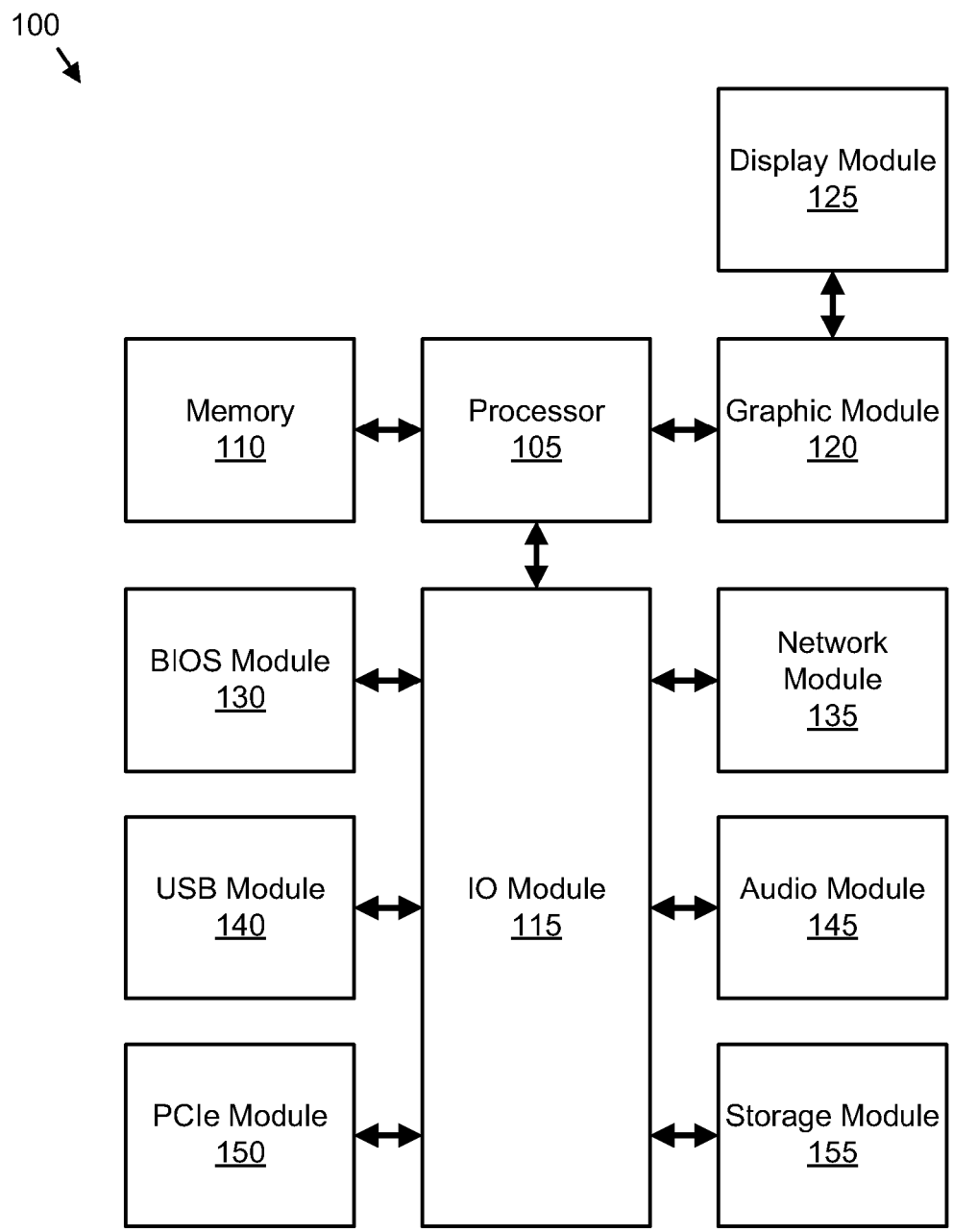
FIG. 1 is a schematic block diagram illustrating one embodiment of a computing device in accordance with the present subject matter.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code.

The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of a computing device 100. The computing device 100 includes a processor 105, a memory 110, an IO module 115, a graphics module 120, a display module 125, a basic input/output system ("BIOS") module 130, a network module 135, a universal serial bus ("USB") module 140, an audio module 145, a peripheral component interconnect express ("PCIe") module 150, and a storage module 155. One of skill in the art will recognize that other configurations of a computing device 100 or multiple computer systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device ("SSD"). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the 10 module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computing device 100, so that computer readable software instructions stored on the storage module 155 can load, execute, and assume control of the computing device 100. Alternatively, the BIOS module 130 may comprise a coded program embedded on a chipset that recognizes and controls various devices that make up the computing device 100.

The network module 135 may communicate with the IO module 115 to allow the computing device 100 to communicate with other devices over a network. The devices may include routers, bridges, computers, printers, and the like. The display module 125 may communicate with the graphic module 120 to display information. The display module 125 may be a cathode ray tube ("CRT"), a liquid crystal display ("LCD") monitor, or the like. The USB module 140 may communicate with one or more USB compatible devices over a USB bus. The audio module 145 may generate an audio output.

Figure 2:
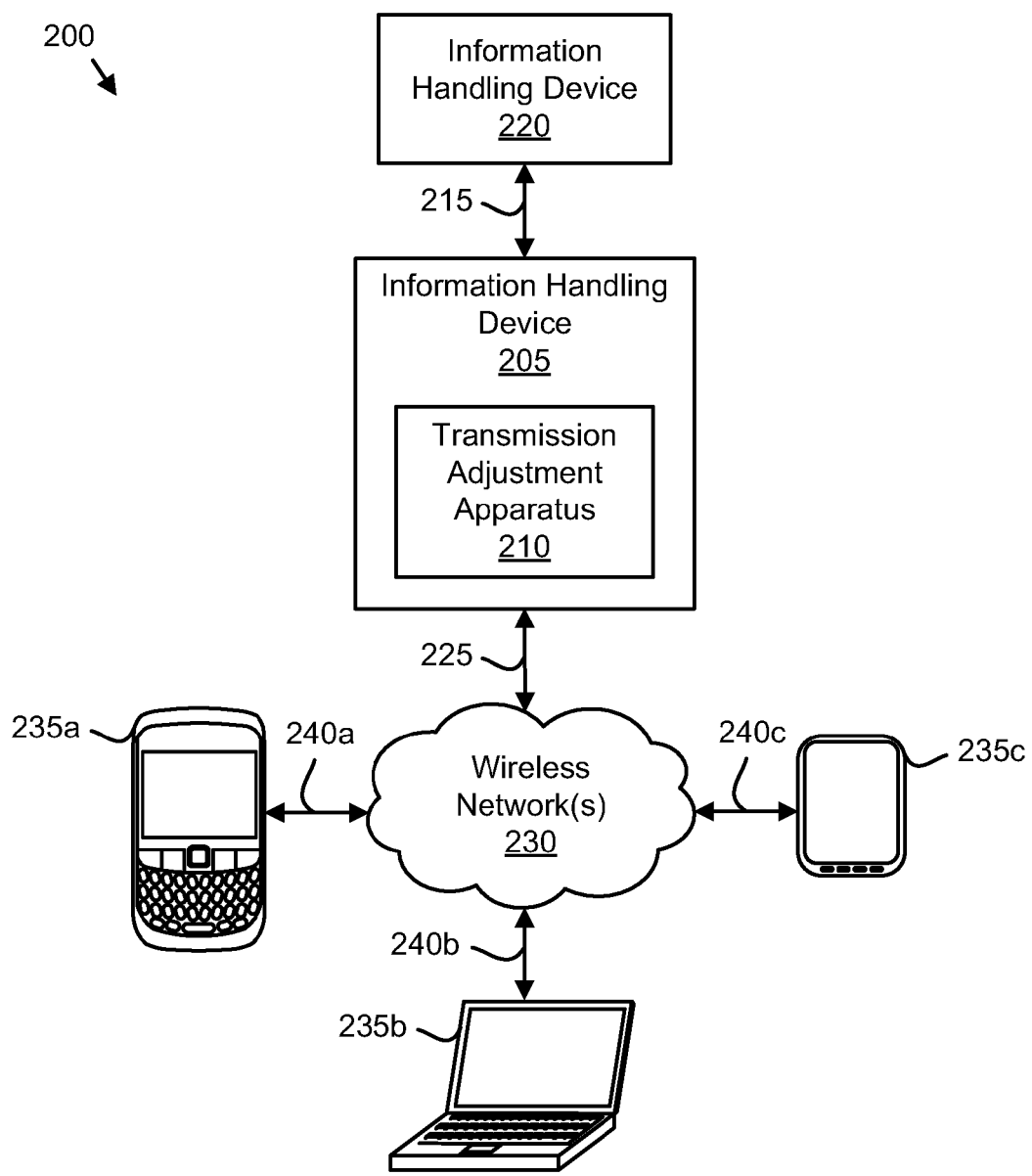
FIG. 2 is a schematic block diagram illustrating one embodiment of a system for setting a rate of data transmission in a peer-to-peer mode in accordance with the present subject matter.

FIG. 2 illustrates one embodiment of a system 200 for setting a rate of data transmission in a peer-to-peer mode. The system 200 includes a first information handling 205 device in communication with a second information handling device 220. The system 200 also includes one or more wireless networks 230 in communication with the first information handling device 205 and also in communication with a plurality of addition information handling devices 235a-c. The first information handling device 205 includes a transmission adjustment apparatus 210.

The first information handling device 205 may be a device capable of communicating wirelessly with one or more other devices. In one embodiment, the first information handling device 205 is a Wireless Local Area Network ("WLAN")

enabled device. In one embodiment, the first information handling device 205 may communicate over one or more wireless channels and/or frequencies according to the Wi-Fi® standard from the Wi-Fi Alliance®, and/or Institute of Electrical and Electronics Engineers ("IEEE") 802.11 standards as is known in the art.

The first information handling device 205 may be capable of communicating in an infrastructure mode involving communicating with one or more wireless networks 230 by way of an access point, which bridges a particular wireless network 230 with a wired Local Area Network ("LAN"). The first information handling device 205 may also be capable of communicating in a peer-to-peer mode directly with other wireless devices. In a further embodiment, the first information handling device 205 is capable of communicating in a peer-to-peer mode according to the Wi-Fi Direct™ standard as specified by the Wi-Fi Alliance®. As is known in the art, with Wi-Fi direct, devices may communicate in peer-to-peer mode over IEEE 802.11 wireless channels and/or frequencies without external access points.

The first information handling device 205 may include memory, a storage device storing computer readable programs, and/or a processor that executes the computer readable programs as is known to those skilled in the art. The first information handling device 205, in certain embodiments, may comprise at least a portion of the components of the computing device 100 depicted in FIG. 1 and may be embodied as a portable or handheld electronic device and/or portable or handheld computing device such as a personal desktop assistant ("PDA"), a tablet computer, a slate or pad computer, an e-Book reader, a mobile phone, a Smartphone, and the like. In other embodiments, the first information handling device 205 may be embodied as a desktop computer, a portable computer, a server, a mainframe computer, and/or the like.

The second information handling device 220 may also be a device capable of communicating wirelessly, such as a WLAN device, and be capable of communicating in a peer-to-peer mode such as Wi-Fi Direct™. In one embodiment, the second information handling device 220 may also be capable of communicating in an infrastructure mode. Like the first information handling device 205, the second information handling device 220 may include memory, a storage device storing computer readable programs, and/or a processor that executes the computer readable programs as is known to those skilled in the art. In one embodiment, the second information handling device 220 includes an electronic display, a wireless High-definition television ("HDTV"), a wireless projector, or the like. The second information handling device 220, in certain embodiments, may be embodied as a portable or handheld electronic device and/or portable or handheld computing device such as a PDA, a tablet computer, a slate or pad computer, an e-Book reader, a mobile phone, a Smartphone, and the like. In other embodiments, the second information handling device 220 may be embodied by a desktop computer, a portable computer, a server, a mainframe computer, and/or the like.

In the depicted embodiment, the first information handling device 205 communicates with the second information handling device 220 wirelessly in a peer-to-peer mode 225. In one embodiment, the first information handling device 205 communicates with the second information handling device 220 according to Wi-Fi Direct™ or other suitable peer-to-peer communication modes communicated over Wi-Fi® and/or 802.11 wireless channels and/or frequencies. In the depicted embodiment, the first information handling device 205 also communicates with one or more wireless networks 230 in an infrastructure mode 225. The one or more wireless networks 230 may comprise WLANs broadcasting in Wi-Fi® and/or 802.11 wireless channels and/or frequencies. In one embodiment, the first information handling device 205 alternates between peer-to-peer mode communication with the second information handling device 220 and infrastructure mode communication through the one or more wireless networks 230 and/or maintains peer-to-peer mode communication with the second information handling device 220 while intermittently communicating in infrastructure mode.

Each of the plurality of additional information handling devices 240a-c may capable of communicating wirelessly through the one or more wireless networks 230. Each additional information handling device 240a-c may comprise a WLAN device and may be capable of communicating in infrastructure mode 240a-c through the one or more wireless networks 230. The additional information handling devices 240a-c may be embodied as portable or handheld electronic devices and/or portable or handheld computing devices such PDAs, tablet computers, slates, e-Book readers, mobile phones, Smartphones, and the like.

The peer-to-peer communication between the first information handling device 205 and the second information handling device 220 may impact wireless communication performance in a particular area (e.g. an area surrounding the first information handling device 205 and the second information handling device 220), especially if the first information handling device 205 communicates substantial amounts of data such as high quality video, if the particular area has a substantial amount of wireless devices communicating over one or more wireless networks 230, and/or if the particular area has a substantial amount of wireless access points. Specifically, if the first information handling device 205 communicates data at a rate above a threshold, the wireless communication performance of additional information handling devices 240a-c in the particular area may degrade.

Therefore, the first information handling device 205 includes a transmission adjustment apparatus 210. In one embodiment, the transmission adjustment apparatus 210 determines an amount of wireless network activity in a particular area (e.g. the area around the first information handling device 205) and sets and/or adjusts a rate of data transmission in a peer to peer mode (e.g. peer-to-peer data transmission from the first information handling device 205 to the second information handling device 220) based on the amount of wireless network activity. The transmission adjustment apparatus 210 may determine the amount of wireless network activity by communicating through infrastructure mode with the one or more wireless networks 230. As a result, if the transmission adjustment apparatus 210 determines that the amount of wireless network activity is above a threshold, the transmission adjustment apparatus 210 may decrease the rate of data transmission in the peer-to-peer mode or set the rate for a subsequent data transmission lower so as to reduce the impact on other wireless communications. Alternatively, if the transmission adjustment apparatus 210 determines that the amount of wireless network activity is below a threshold, the transmission adjustment apparatus 210 may increase or maintain the rate of data transmission in the peer-to-peer mode or set the rate for a subsequent data transmission higher than a baseline.

The transmission adjustment apparatus 210 may reside in or be in communication with an information handling device that engages in wireless communication (e.g. the first information handling device 205). In one embodiment, the transmission adjustment apparatus 210 resides in an information handling device that transmits data to another device in peer-to-peer mode. All or a portion of the transmission adjustment apparatus 210 may be stored on memory and executed by a processor (e.g. of the first information handling device 205) and/or may be implemented as logic hardware. Furthermore, the transmission adjustment apparatus 210 may, in one embodiment, comprise driver level and/or firmware level code in the first information handling device 205. In one embodiment, the transmission adjustment apparatus 210 may be integrated with and/or in communication with software, drivers, hardware, and/or firmware responsible for wireless (e.g. WLAN) communication of the first information handling device 205.

Figure 3:
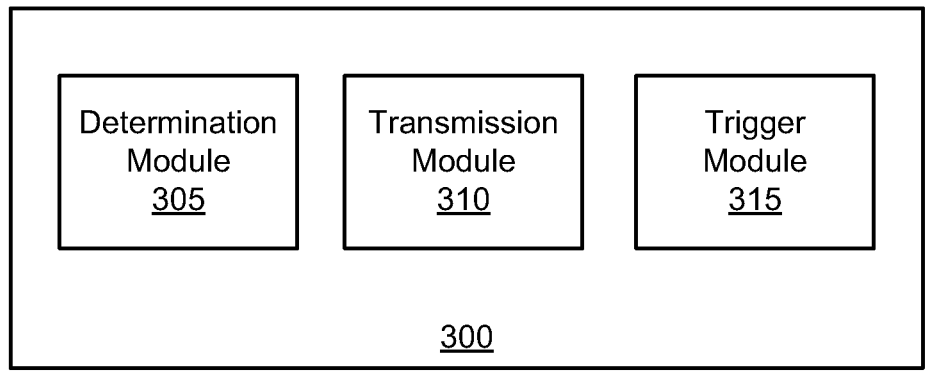
FIG. 3 is a schematic block diagram illustrating one embodiment of an apparatus for setting a rate of data transmission in a peer-to-peer mode in accordance with the present subject matter.

FIG. 3 illustrates one embodiment of an apparatus 300 for setting a rate of data transmission in a peer-to-peer mode. The apparatus 300 may comprise one embodiment of the transmission adjustment apparatus 210 depicted in FIG. 2. The description of the apparatus 300 refers to elements of FIGS. 1-2, like numbers referring to like elements. The apparatus 300 includes one or more of a determination module 305, a transmission module 310, and a trigger module 315.

The determination module 305 determines an amount of wireless network activity. In one embodiment, the wireless activity comprises wireless communications on IEEE 802.11 wireless channels in a particular area in wireless range of a particular information handling device 205 (e.g. in which the determination module 305 resides or is otherwise in communication with). In one embodiment, the determination module 305 determines the amount of wireless network activity through a wireless communication infrastructure mode. Furthermore, the determination module 305 may determine whether the amount of wireless activity is above or below one or more thresholds and/or quantifies the wireless activity. In one embodiment, the determination module 305 may determine that a rate of data transmission in a peer-to-peer mode is to be set at a certain level and/or adjusted based on the determined wireless activity. The determination module 305 may determine certain levels of wireless activity (e.g. ranging from "low activity" to "high activity," using a numeric classification, and the like) based on certain indicators such as whether a wireless channel is available, how much wireless activity is on the available channel, and the like. For example, the determination module 305 may classify the unavailability of any wireless channels as indicative of the wireless activity having "high activity" and may further classify intermediate levels of activity based on the activity on an available channel as described below.

Specifically, in one embodiment, the determination module 305 determining the amount of wireless network activity includes the determination module 305 searching for an available wireless channel. The determination module 305 may scan 802.11 wireless channels for an available channel. In one embodiment, the determination module 305 searches for available channels by way of software, drivers, hardware, and/or firmware responsible for wireless (WLAN) communication of the particular information handling device 205. Specifically, the determination module 305 may interface with the software, drivers, hardware, and/or firmware to search for available channels.

The lack of an available channel may indicate that the wireless activity in the particular area is substantial. In one embodiment, the determination module 305 signals the transmission module 310 to decrease the rate of data transmission in the peer to peer mode and/or to set a uncommenced data transmission at a certain level in response to the determination module 305 failing to locate an available wireless channel.

If the determination module 305 locates an available wireless channel, the determination module 305 may determine an amount of wireless activity on the available channel. In one embodiment, the determination module 305 broadcasts and/or facilitates broadcasting a Request to Send ("RTS") frame on the available channel. The determination module 305 may receive a Clear to Send ("CTS") frame from an access point on the available channel. A CTS frame, as known in the art, describes a transmission time and specifically, may include a time indicating a time period for the requesting station to send its frame of data. The determination module 305 may determine the amount of wireless activity on the available channel based on the transmission time in the CTS frame. If the transmission time is a time near to the present time, the amount of wireless activity on the available channel is less and the farther the transmission time is away from the present time, the higher the level of wireless activity on the available channel. The determination module 305 may transmit a data frame, in response to receiving the CTS frame, with a minimum length so as to minimize wireless traffic while still completing the RTS/CTS handshake.

The transmission module 310 sets a rate of data transmission in a peer to peer mode based on the amount of wireless network activity determined by the determination module 305. In one embodiment, the transmission module 310 decreases the rate of data transmission in the peer to peer mode and/or sets a rate of an uncommenced data transmission to a lower level from a baseline level in response to the determination module 305 failing to locate an available wireless channel.

In one embodiment, the data transmission includes video data. In this embodiment, the transmission module 310 may set the rate of the data transmission by setting a video quality of the video data. In a further embodiment, the transmission module 310 sets the video quality of the video data by setting and/or adjusting a video frame rate, a video refresh rate, a video color depth, and a video resolution. For example, if the determination module 305 fails to locate an available wireless channel, the transmission module 310 may reduce the frame rate of the video transmitted from the first information handling device 205 to the second information handling device 220.

In one embodiment, the data transmission is an uncommenced data transmission and the transmission module 310 sets an initial rate of the data transmission in the peer to peer mode based on the amount of wireless network activity. In one embodiment, the data transmission is an ongoing data transmission and the transmission module 310 adjusts a rate of the ongoing data transmission in the peer to peer mode based on the amount of wireless network activity. As stated above, the transmission module 310 may decrease the rate of data transmission in the peer to peer mode in response to the determination module 305 determining that the amount of wireless network activity is above a threshold and/or is quantified at a certain value. Furthermore, the transmission module 310 may increase the rate of data transmission in the peer to peer mode in response to the determination module 305 determining that the amount of wireless network activity is below a threshold.

In one embodiment, the transmission module 310 decreases the rate of data transmission in the peer to peer mode in response to the determination module 305 determining that the amount of wireless network activity on the available channel is above a threshold. The transmission module 310 may also increase the rate of data transmission in the peer to peer mode in response to the determination module 305 determining that the amount of wireless network activity on the available channel is below a threshold.

In one embodiment, the transmission module 310 sets the rate of data transmission according to a plurality of thresholds indicative of various levels of wireless activity determined by the determination module 305. The transmission module 310 may also leave the rate of an ongoing data transmission unchanged based on the amount of wireless network activity (e.g. the current rate is suitable in view of the amount of wireless traffic). In one non-limiting example, the transmission module 310 may increase the rate of data transmission by 10% in response to the determination module 305 locating an available channel with a transmission time below 30 usec, may maintain the current rate of data transmission in response to the determination module 305 locating an available channel with a transmission time above 30 usec, and may decrease the rate of data transmission by 10% in response to the determination module 305 failing to locate an available channel.

The trigger module 315 triggers the determination module 305 to determine the amount of wireless network activity in response to trigger criteria such as a predetermined amount of data transmitted in the peer to peer mode and/or a predetermined amount of time (e.g. time transmitting in the peer to peer mode).

Figure 4:
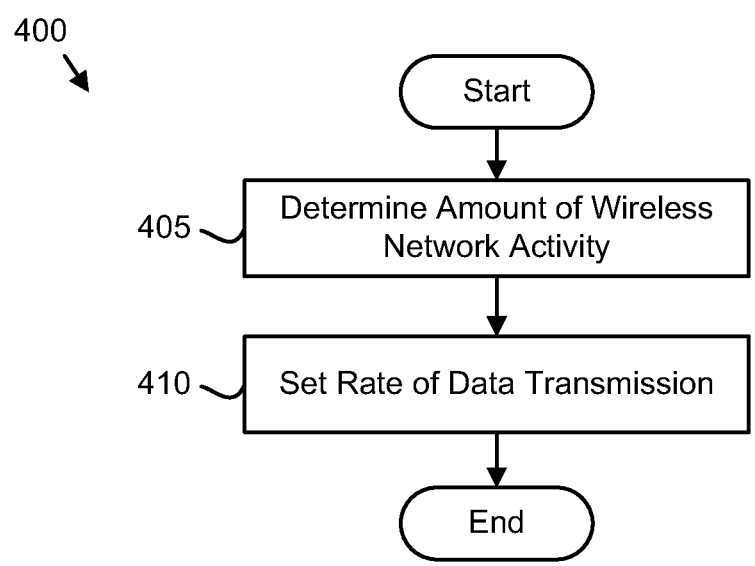
FIG. 4 is a schematic flow chart diagram illustrating one embodiment of a method for setting a rate of data transmission in a peer-to-peer mode in accordance with the present subject matter.

FIG. 4 illustrates one embodiment of a method 400 for setting a rate of data transmission in a peer-to-peer mode. The method 400 may implement at least a portion of the functions of the apparatus 400 of FIG. 4. The description of the method 400 refers to elements of FIGS. 1-3, like numbers referring to like elements.

The method 400 begins and the determination module 305 determines 405, through a wireless communication infrastructure mode, an amount of wireless network activity. Next, the transmission module 310 sets 410 a rate of data transmission in a peer to peer mode based on the amount of wireless network activity. In one embodiment, the data transmission includes video data and the transmission module 310 setting the rate of data transmission includes setting a video quality of the video data such as setting a video frame rate, a video refresh rate, a video color depth, a video resolution, and the like. Then, the method 400 ends.

Figure 5:
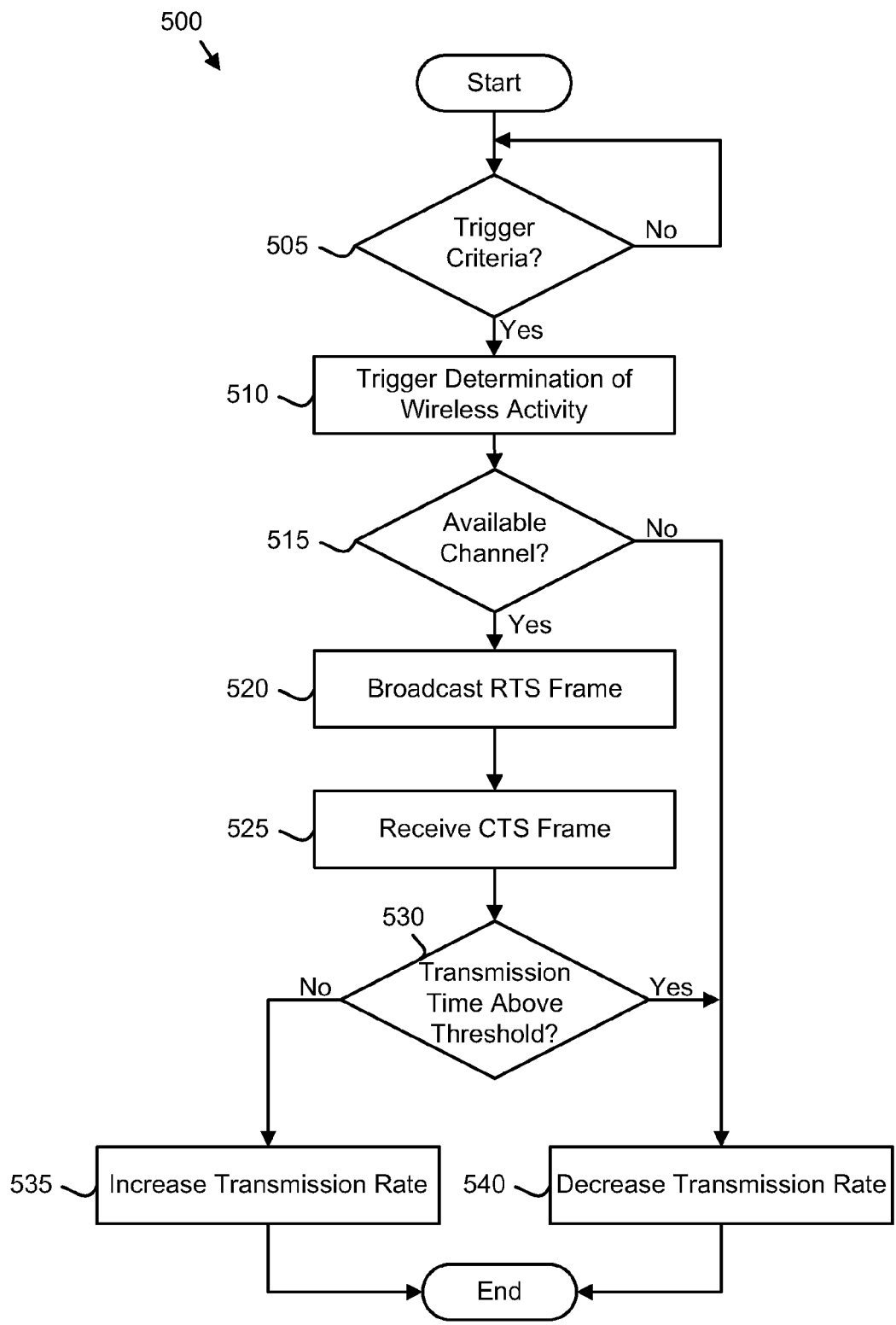
FIG. 5 is a detailed schematic flow chart diagram illustrating another embodiment of a method for setting a rate of data transmission in a peer-to-peer mode in accordance with the present subject matter.

FIG. 5 illustrates another embodiment of a method 500 for setting a rate of data transmission in a peer-to-peer mode. The method 500 may implement at least a portion of functions of the apparatus 300 of FIG. 3. The description of the method 500 refers to elements of FIGS. 1-3, like numbers referring to like elements.

The method 500 begins and the trigger module 315 monitors 505 for trigger criteria such as a predetermined amount of data transmitted as part of an ongoing data transmission in a peer-to-peer mode and/or a predetermined amount of time transmitting data in the ongoing data transmission in the peer-to-peer mode. The data may be transmitted from a first information handling device 205 to a second information handling device 220. In one embodiment, the data is video data and is transmitted from a first information handling device 205 to an electronic display. When the trigger module 315 detects 505 trigger criteria, the trigger module 315 triggers 510 the determination module 305 to determine an amount of wireless activity on one or more wireless networks and/or wireless channels in a surrounding area.

The determination module 305 searches 515 wireless channels for an available wireless channel. If the determination module 305 does not locate an available channel, the transmission module 310 decreases a transmission rate of the data transmission and the method 500 ends. Alternatively, if the determination module 305 locates 515 an available channel, the determination module 305 broadcasts 520 an RTS frame on the available channel. The determination module 305 then receives 525 a CTS frame from an access point on the available channel. The CTS frame describes a transmission time. If the transmission time specifies a time in the future above a predetermined threshold, the transmission module 310 decreases 540 a transmission rate of the data transmission and the method 500 ends.

Alternatively, if the transmission time specifies a time in the future below a predetermined threshold, the transmission module 310 increases 535 the transmission rate of the data transmission and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an information handling device having a processor, the information handling device configured to operate in one of an infrastructure mode and a peer to peer mode;
a memory storing module for execution by the processor, the memory comprising:
a determination module determining an amount of wireless network activity at the information handling device, the network activity determined the information handling device communicating with a wireless access point in the infrastructure mode; and
a transmission module adjusting a video quality of video data, the video data transmitted to a display communicating in the peer to peer mode with the information handling device, the video quality of video data comprising one of a video frame rate, a video refresh rate, a video color depth, and a video resolution, the video quality of video data based on the amount of wireless network activity measured in the infrastructure mode,
wherein the determining the amount of wireless activity in the infrastructure mode further comprises:
broadcasting a Request To Send ("RTS") frame on an available channel; receiving a Clear To Send ("CTS") frame from an access point on the available channel, the CTS frame describing a transmission time; and determining the amount of wireless activity on the available channel based on the transmission time in the CTS frame.

2. The apparatus of claim 1, wherein the video data transmission comprises an ongoing video data transmission and wherein the transmission module adjusts a video quality of the ongoing video data transmission.

3. The apparatus of claim 1, wherein the transmission module decreases the video quality of video data transmitted in the peer to peer mode in response to the determination module determining that the amount of wireless network activity in the infrastructure mode is above a threshold and wherein the transmission module increases the video quality of video data transmitted in the peer to peer mode in response to the determination module determining that the amount of wireless network activity in the infrastructure mode is below a threshold.

4. The apparatus of claim 1, wherein the transmission module adjusts the quality of video data by reducing a frame rate of a video transmitted to the display.

5. The apparatus of claim 1, wherein the transmission module adjusting the video quality of the video data comprises the transmission module reducing a video resolution of a video transmitted to the display.

6. The apparatus of claim 1, further comprising a trigger module triggering the determination module to determine the amount of wireless network activity in the infrastructure mode in response to one of a predetermined amount of data transmitted in the peer to peer mode and a predetermined amount of time.

7. The apparatus of claim 1, wherein the determination module determining the amount of wireless network activity in the infrastructure mode further comprises the determination module searching for an available wireless channel, the transmission module decreasing the video quality of video data transmitted in the peer to peer mode in response to the determination module failing to locate the available wireless channel, wherein the determination module determines an amount of wireless activity in the infrastructure mode on the available channel in response to the determination module locating the available wireless channel.

8. The apparatus of claim 7, wherein the transmission module decreases the video quality of video data transmitted in the peer to peer mode in response to the determination module determining that the amount of wireless network activity in the infrastructure mode on the available channel is above a threshold and wherein the transmission module increases the video quality of video data transmitted in the peer to peer mode in response to the determination module determining that the amount of wireless network activity in the infrastructure mode on the available channel is below a threshold.

9. A method comprising:
determining an amount of wireless network activity of a wireless network at an information handling device, the information handling device configured to operate in one of an infrastructure mode and a peer to peer mode, the wireless network activity measured by the information handling device communicating with a wireless access point in the infrastructure mode; and
adjusting a video quality of video data transmitted to a display communicating in the peer to peer mode with the information handling device, the video quality of video data comprising one of a video frame rate, a video color depth, and a video resolution, the video quality based on the amount of wireless network activity measured in the infrastructure mode,
wherein the determining the amount of wireless activity in the infrastructure mode further comprises:
broadcasting a Request To Send ("RTS") frame on an available channel; receiving a Clear To Send ("CTS") frame from an access point on the available channel, the CTS frame describing a transmission time; and determining the amount of wireless activity on the available channel based on the transmission time in the CTS frame.

10. The method of claim 9, further comprising decreasing the video quality of video data transmitted in the peer to peer mode in response to determining that the amount of wireless network activity in the infrastructure mode is above a threshold and increasing the video quality of video data transmitted in the peer to peer mode in response to determining that the amount of wireless network activity in the infrastructure mode is below a threshold.

11. The method of claim 9, wherein adjusting a video quality of video data comprises reducing a frame rate of the video data transmitted to the display.

12. The method of claim 9, wherein determining the amount of wireless network activity further comprises searching for an available wireless channel.

13. The method of claim 12, further comprising decreasing the video quality of video data transmitted in the peer to peer mode in response to failing to locate the available wireless channel.

14. The method of claim 12, further comprising determining an amount of wireless activity on the available channel in response to locating the available wireless channel.

15. The method of claim 9, further comprising decreasing the video quality of video data transmitted in the peer to peer mode in response to determining that the amount of wireless network activity in the infrastructure mode on the available channel is above a threshold and increasing the video quality of video data transmitted in the peer to peer mode in response to determining that the amount of wireless network activity in the infrastructure mode on the available channel is below a threshold.

16. A computer program product comprising a storage device storing machine readable code executed by a processor to perform the operations of:
determining an amount of wireless network activity of a wireless network, the network activity measured at an information handling device, the information handling device configured to operate in one of an infrastructure mode and a peer to peer mode, the wireless network activity measured by the information handling device communicating with a wireless access point in the infrastructure mode; and
adjusting a video quality of video data transmitted to a display communicating in the peer to peer mode with the information handling device, the video quality of video data comprising one of a video frame rate, a video color depth, and a video resolution, the video quality based on the amount of wireless network activity measured in the infrastructure mode,
wherein the determining the amount of wireless activity in the infrastructure mode further comprises:
broadcasting a Request To Send ("RTS") frame on an available channel; receiving a Clear To Send ("CTS") frame from an access point on the available channel, the CTS frame describing a transmission time; and determining the amount of wireless activity on the available channel based on the transmission time in the CTS frame.

17. The computer program product of claim 16, further comprising decreasing the video quality of video data transmitted in the peer to peer mode in response to determining that the amount of wireless network activity in the infrastructure mode is above a threshold and increasing the video quality of video data transmitted in the peer to peer mode in response to determining that the amount of wireless network activity in the infrastructure mode is below a threshold.

18. The computer program product of claim 16, wherein setting the video quality of video data transmitted comprises reducing a video frame rate for the video data.

19. The computer program product of claim 16, wherein determining the amount of wireless network activity in the infrastructure mode further comprises searching for an available wireless channel and further comprises decreasing the video quality of video data transmitted in the peer to peer mode in response to failing to locate the available wireless channel in the infrastructure mode and determining an amount of wireless activity in the infrastructure mode on the available channel in response to locating the available wireless channel, further comprises adjusting the video quality of video data transmitted in the peer to peer mode based on the amount of wireless activity in the infrastructure mode on the available channel.

* * * * *